US011476755B2

(12) United States Patent
Quelen

(10) Patent No.: US 11,476,755 B2
(45) Date of Patent: Oct. 18, 2022

(54) CIRCUIT FOR SERVO-CONTROLLING THE INPUT IMPEDANCE OF AN INTERFACE OF A HARVESTER

(71) Applicant: COMMISSARIAT A L'ENERGIE ATOMIQUE ET AUX ENERGIES ALTERNATIVES, Paris (FR)

(72) Inventor: Anthony Quelen, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 79 days.

(21) Appl. No.: 17/109,358

(22) Filed: Dec. 2, 2020

(65) Prior Publication Data

US 2021/0194359 A1      Jun. 24, 2021

(30) Foreign Application Priority Data

Dec. 23, 2019   (FR) ..................... 19 15436

(51) Int. Cl.
| H02M 3/155 | (2006.01) |
| H02J 50/00 | (2016.01) |
| H02J 7/02 | (2016.01) |
| H02M 7/217 | (2006.01) |

(52) U.S. Cl.
CPC ............. H02M 3/155 (2013.01); H02J 7/02 (2013.01); H02J 50/001 (2020.01); H02M 7/217 (2013.01)

(58) Field of Classification Search
CPC .......... H02M 3/155; H02M 7/217; H02J 7/02; H02J 50/001; H02J 2207/50
See application file for complete search history.

(56) References Cited

U.S. PATENT DOCUMENTS

2015/0234416 A1*   8/2015   Ramorini ............. H02J 50/001
                                                         323/299
2016/0172873 A1*   6/2016   Hall ......................... H02J 1/10
                                                         307/20

OTHER PUBLICATIONS

U.S. Appl. No. 16/743,046, filed Jan. 15, 2020, 2020/0228026 A1, Quelen, A.
French Preliminary Search Report dated Aug. 14, 2020 in French Application (with English Translation of Categories of Cited Documents), 3 pages.
Radhakrishna et al., "A low-power integrated power converter for an electromagnetic vibration energy harvester with 150 mV-AC cold startup, frequency tuning, and 50Hz AC-to-DC conversion", IEEE, 2018, 4 pages.
Leicht et al., "Electromagnetic Vibration Energy Harvester Interface IC with Conduction-Angle-Controlled Maximum-Power-Point Tracking and Harvesting Efficiencies of up to 90%", ISSCC, 2015, 3 pages.

(Continued)

Primary Examiner — John W Poos
Assistant Examiner — Tyler J Pereny
(74) Attorney, Agent, or Firm — Oblon, McClelland, Maier & Neustadt, L.L.P.

(57) ABSTRACT

An interface electronic circuit between an energy harvesting stage is provided with an inductor and a charging stage, the interface electronic circuit having a regulation circuit capable of servo-controlling an average input impedance value of the interface electronic circuit to a predetermined optimum impedance value.

16 Claims, 9 Drawing Sheets

(56) References Cited

OTHER PUBLICATIONS

Leicht et al., "Autonomous and Self-Starting Efficient Micro Energy Harvesting Interface with Adaptive MPPT, Buffer Monitoring, and Voltage Stabilization", European Solid-State Circuits Conference, 2012, pp. 101-104.

Wang et al., "Electromagnetic Energy Harvester Interface Design for Wearable Applications", IEEE Transactions on Circuits and Systems II, vol. 65, No. 5, 2018, pp. 667-671.

Carreon-Bautista et al., "Boost Converter With Dynamic Input Impedance Matching for Energy Harvesting With Multi-Array Thermoelectric Generators", IEEE Transactions on Industrial Electronics, vol. 61, No. 10, Oct. 2014, 9 pages.

Serdijn et al., "Introduction to RF Energy Harvesting", Wearable Sensors: Fundamentals, Implementation and Applications, Aug. 14, 2014, 24 pages.

Hsieh et al., "Improving the Scavenged Power of Nonlinear Piezoelectric Energy Harvesting Interface at Off-Resonance by Introducing Switching Delay", IEEE Transactions on Power Electronics, vol. 30, No. 6, Jun. 1, 2015, 14 pages.

\* cited by examiner

CIRCUIT FOR SERVO-CONTROLLING THE INPUT IMPEDANCE OF AN INTERFACE OF A HARVESTER

TECHNICAL FIELD

The present application relates to the field of harvesting electromagnetic vibratory energy and finds applications in particular in systems called "autonomous" energy systems such as wireless sensor nodes, for example implementing solar, or mechanical or electromagnetic or thermal energy harvesting.

It relates more particularly to an interface electronic architecture between an energy harvesting stage intended to produce an amplitude and/or frequency variable electrical signal, which will be called AC signal for simplification, and a charging stage provided with a means for storing this energy from a DC signal.

A simplified architecture of such an energy harvesting system is given in FIG. 1, with a harvester 11 modelled by, or having as equivalent electrical circuit, a generator 1, an inductor L, and a resistor $R_S$ placed in series.

Such harvesters are typically followed by an interface electronic circuit 12 which allows to convert the energy of the harvester in order to store it in a charge storage means 13 such as a battery or a large capacitor $C_{tank}$. Once the energy is stored, it can be used to capture information from the environment and potentially emit information to a central base. For this purpose, the charge storage means 13 can be associated with an RF emitter 14.

The interface circuit 12 is in particular provided with an AC-DC rectifier stage, which allows to convert a differential AC signal into a DC signal. The typical constraints for making this interface electronic circuit 12 are:

maximising the energy stored in the storage means 13,
maximising the extraction efficiency, in other words maximising the electrical energy extracted from the electromagnetic harvester 11,
maximising the conversion efficiency in other words minimising the losses of the AC-DC rectifier,
limiting the number of external components, in particular inductors, external capacitors in order to minimise the cost of the circuit and to minimise its size on a substrate, again for cost reasons.

The document by Radhakrishna and al.: "A low-power integrated power converter for an electromagnetic vibration energy harvester with 150 mV-AC sold startup, frequency tuning, and 50 Hz AC-to-DC conversion", IEEE 2018 shows an interface circuit architecture with a regulation circuit allowing to improve the extraction efficiency. The interface circuit shown here uses an inductor external to the harvester. It implements a slow regulation which is not adapted to some types of harvesters, in particular to those allowing to extract the energy coming from episodic shocks and/or where the signal produced by the harvester varies from one use to another.

The document by Leicht and al.: "Electromagnetic Vibration Energy Harvester Interface IC with Conduction-Angle-Controlled Maximum-Power-Point Tracking and Harvesting Efficiencies of up to 90%", ISSCC 2015 also shows an interface circuit architecture with improved extraction efficiency. This circuit uses a microcontroller to regulate the input impedance of the interface circuit. It has the disadvantage of using an inductor external to the harvester and an external resistor which limit the conversion efficiency.

There is problem of producing a new interface circuit between electromagnetic energy harvesting stage and a charging stage, which has improved energy efficiency and which, preferably, has as few bulky external passive components as possible and has a minimum surface.

DESCRIPTION OF THE INVENTION

An embodiment of the present invention provides an interface electronic circuit intended to be connected at the input to an energy harvesting stage, the energy harvesting stage having an equivalent circuit or being able to be modelled by a circuit comprising an alternating voltage source in series with an inductor Ls and a resistor Rs, the interface electronic circuit being able to be connected at the output to a charging stage, the interface electronic circuit comprising:

first and second input terminals receiving an electrical signal delivered by said harvesting stage between these terminals, a first switch, arranged between the first terminal and the second terminal and capable of alternately connecting or disconnecting the first terminal and the second terminal from each other, the closed or open state of the first switch being governed by a first control signal, a second switch, disposed between said first terminal and the charging stage and capable of alternately connecting or disconnecting an output of the interface electronic circuit of said charging stage by respectively allowing a current to flow or not between said first terminal and said charging stage, the open or closed state of the second switch being governed by a second control signal, a block for controlling the first switch and the second switch configured to produce said first control signal and said second control signal, the control block being able to pass the interface electronic circuit into an operating mode wherein said interface electronic circuit follows a succession of phases during each of which said interface electronic circuit adopts a first configuration and then a second configuration, the first configuration being a configuration among a discharging configuration and a charging configuration, the second configuration being a configuration among a charging configuration and a discharging configuration and different from the first configuration, the charging configuration being a configuration of the first switch and of the second switch so as to disconnect the output of the interface electronic circuit from said charging stage and that a charge current $I_{ON}$ flows between the first terminal and the second terminal, the discharging configuration being a configuration of the first switch and of the second switch, so that said first terminal and said second terminal are disconnected from each other and the output of said interface electronic circuit is connected to the charging stage so that a discharge current $I_{OFF}$ flows between the output of the interface electronic circuit and the charging stage, the interface electronic circuit being further provided with:

a regulation circuit for servo-controlling an average input impedance value $\overline{Z_{in}}$ of the interface electronic circuit to a predetermined optimum impedance value $R_{opt}$, said regulation circuit comprising:

a first circuit delivering a first signal $V_3$ proportional to an average current $\overline{Ih}$ in an inductor of the harvesting stage, and a second circuit delivering a second signal $V_4$ proportional to an average voltage $\overline{Vh}$ at the terminals of an internal voltage source of said harvesting stage, a comparator configured to compare the first signal $V_3$ and the second signal $V_4$ and produce at the output according to this comparison an indicator signal capable of indicating that a ratio between the average voltage $\overline{Vh}$ and the average current $\overline{Ih}$ over a given time interval has reached the predetermined optimum impedance value Ropt and of triggering a passage from said second configuration to said first configuration.

Such a regulation circuit allows an improved extraction efficiency to be obtained.

According to one embodiment, the regulation circuit can comprise:
   one or more charge current copy stages,
   one or more discharge current copy stages,
   a charge or discharge current differentiator stage,
   a plurality of integrator stages.

The regulation circuit can then be configured, from at least one copy of the charge current $I_{ON}$ and at least one copy of the discharge current $I_{OFF}$, to produce said first signal $V_3$ at the terminals of a first integration capacitor of a first integrator stage, and from at least one copy of the charge current and at least one derivative of a copy of the charge current or from at least one copy of the discharge current and at least one derivative of a copy of the discharge current, to produce said second signal $V_4$ at the terminals of a second integration capacitor of a second integrator stage.

Advantageously, the control block can be configured so that:
   when the interface circuit is in said first configuration for a predefined duration, at the end of the predefined duration:
   the control block maintains the first configuration for at least a predetermined minimum period when the output of said comparator is in a predetermined state, said predefined duration being equal to the predetermined minimum period or to a multiple of said predetermined minimum period,
   the control block triggers a passage from the first configuration to said second configuration when the output of said comparator is in another state, different from said predetermined state, then,
   when the interface circuit passes into the second configuration, the control block maintains the second configuration until the output of said comparator switches from said other state to said predetermined state, this switching producing said indicator signal.

According to one possible implementation, the regulation circuit can further comprise: a first reset element and a second reset element configured respectively to empty the first capacitor and the second capacitor following the reception of a reset signal, the reset signal being produced:
   when said interface circuit is in the first configuration and at least a predetermined minimum period has expired since the passage into the first configuration and the output of said comparator is in said predetermined state, or
   when said interface circuit is in the second configuration and the output of said comparator switches to said predetermined state.

Advantageously, the interface electronic circuit can further comprise a delay stage configured to emit a signal of the end of the predetermined minimum period a predetermined delay after the start of the first configuration.

According to an advantageous embodiment, the regulation circuit belongs to a generator block to which the signal of the end of the predetermined minimum period is transmitted, said generator block being configured, when the interface circuit passes into the first configuration, regardless of the state at the output of the comparator after the predetermined minimum period, to emit the reset signal then, after a new predetermined minimum period, when the output of said comparator is in said other state, to emit a signal indicating the end of the first configuration.

According to a first possible implementation, the first capacitor is charged, during said given time interval, from a current called "numerator" current which depends on or is equal to a sum:
   of a current resulting from a copy of the charge current for a duration of a charging configuration and,
   of another current resulting from a copy of the discharge current for a duration of a discharging configuration.

Advantageously, the first signal $V_3$ can depend on the product:

$$\overline{I_H}T = \int_0^T T_{ON}I_{ON} + T_{OFF}I_{OFF} dt$$

with:
   T the duration of said given time interval,
   $T_{ON}$ the duration of the charging configuration during the given time interval, and
   $T_{OFF}$ the duration of said discharging configuration during the given time interval.

Alternatively, according to a second possible implementation, the first capacitor is charged from a current called "numerator" current, the numerator current depending on or being equal to a sum:
   of a current resulting from a copy of the charge current for a duration of a charging configuration,
   of a current resulting from a derivative of a copy of the charge current,
   of another current resulting from a copy of the discharge current for a duration of a discharging configuration.

Advantageously, the first signal can depend on the product:

$$\overline{I_H}T = \int_0^T T_{ON}\left(I_{ON} - \frac{1}{2}T_{ON}\frac{dI_{ON}}{dt}\right) + T_{OFF}I_{OFF} dt$$

with:
   T the duration of said given time interval,
   $T_{ON}$ the duration of the charging configuration during said given phase, and
   $T_{OFF}$ the duration of said discharging configuration during said given time interval.

According to a possible embodiment, the regulation circuit can comprise another integrator stage provided with another integration capacitor which is charged from a current called "denominator" current and at the terminals of which a voltage is produced, the denominator current depending on, or being equal to, the sum:
   of a current resulting from a copy of the charge current for the duration of a charging configuration,
   of another current resulting from a derivative of a copy of the charge current for a duration of a charging configuration, said second signal $V_4$ produced at the terminals of said second integration capacitor being charged from a current resulting from a voltage-to-current conversion of said voltage produced by said other integration capacitor.

Advantageously, the second signal $V_4$ is representative of the average voltage $\overline{Vh}$, with:

$$\overline{Vh} * T_{ON} = R_S \int_0^{T_{ON}} \frac{L}{R_S} * \frac{dI_{ON}}{dt} + I_{ON} dt$$

$T_{ON}$ being the duration of a discharging configuration.

According to a variant embodiment of the interface electronic circuit wherein said first configuration is a discharging configuration, said indicator signal indicating an end-of-charging configuration, said regulation circuit may further comprise:

a voltage-to-current conversion stage configured to convert a copy of an output voltage at the output of said interface circuit into an image current of this output voltage, said regulation circuit including another integrator stage provided with another integration capacitor which charges from a current called "denominator" current and at the terminals of which a voltage called "integration" voltage is produced, the denominator current depending on, or being equal to, the sum:

of a current $K_V*V_{OUT}$, resulting from a conversion produced by said voltage-to-current conversion stage, of a current $K_P*I_{OFF}$ resulting from a copy of the discharge current, of another current $K_{D1}*dI_{OFF}/dt$ resulting from a derivative of a copy of the discharge current $I_{OFF}$, said second signal $V_4$ being produced at the terminals of said second integration capacitor being charged from a current resulting from a voltage-to-current conversion of said integration voltage produced by said other integration capacitor.

According to this variant, the second signal $V_4$ can be representative of the average voltage $\overline{Vh}$, such that:

$$\overline{Vh} * T_{OFF} = R_S \int_0^{T_{OFF}} \frac{L}{R_S} * \frac{dI_{OFF}}{dt} + \frac{V_{OUT}}{R_S} + I_{OFF} dt$$

$T_{OFF}$ being the duration of a discharging configuration.

Advantageously, the regulation circuit further comprises: an element for resetting said other integration capacitor.

A particular embodiment provides that the interface electronic circuit is provided with a rectifier. This rectifier is typically connected, on the one hand, to said first and second terminals of said interface electronic circuit, and on the other hand, connected to a terminal of the second switch.

BRIEF DESCRIPTION OF THE DRAWINGS

The present invention will be better understood upon reading the description of exemplary embodiments given, purely as an indication and in no way limiting manner, with reference to the appended drawings wherein.

Identical, similar or equivalent parts of the different figures bear the same reference numerals so as to facilitate the passage from one figure to another.

The different parts shown in the figures are not necessarily at a uniform scale, to make the figures more readable.

DETAILED DESCRIPTION OF PARTICULAR EMBODIMENTS

An interface electronic circuit for an autonomous electrical energy system and as implemented according to an embodiment of the present invention will now be described in connection with FIGS. 2, 3 and 4.

The system comprises an energy harvesting stage 110 which includes an inductor and is intended to produce a vibratory electrical signal resulting from an energy conversion. Typically, the energy conversion follows a mechanical excitation, but the energy harvesting stage 110 may alternatively be adapted for harvesting another type of energy such as solar, electromagnetic or thermal energy.

Figure 1:
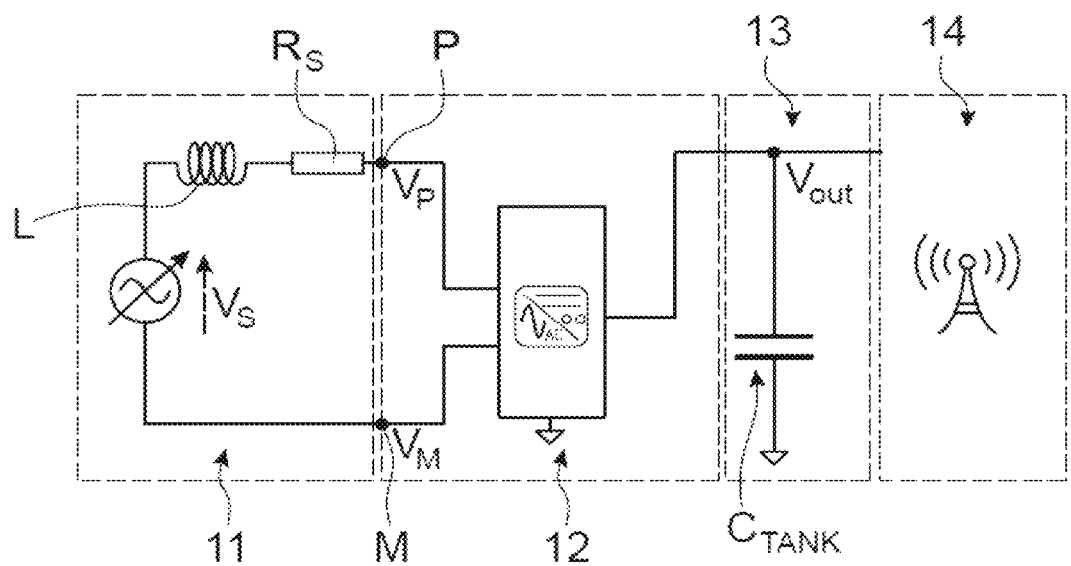
FIG. 1 is used to illustrate an electromagnetic energy harvesting system architecture with a circuit allowing to perform a conversion of a vibratory signal at the output of a harvester and for providing a DC signal to a charging stage.
Figure 2:
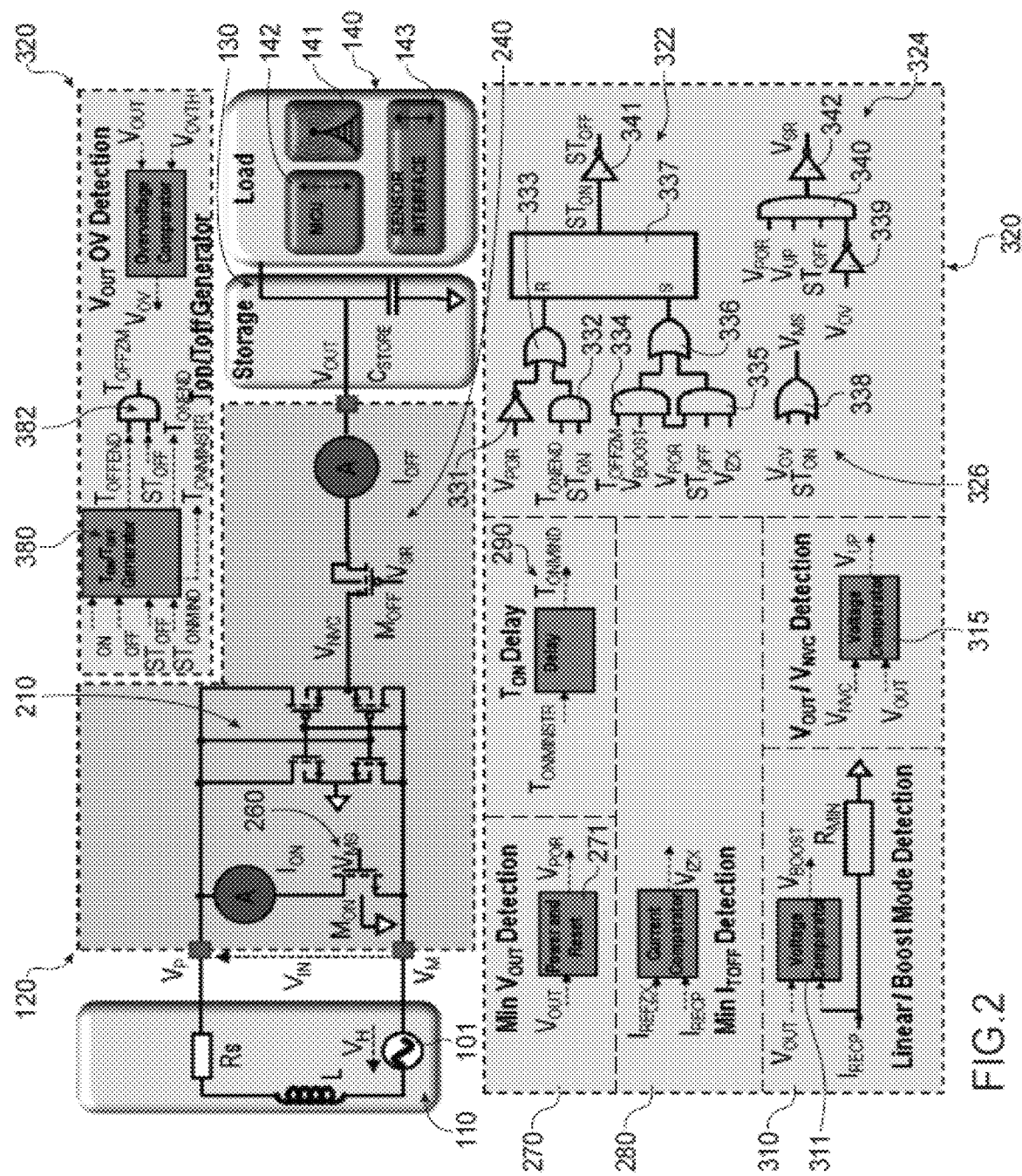
FIG. 2 is used to illustrate a particular embodiment of an interface electronic circuit between an energy harvesting stage and an energy storage means, the interface electronic circuit being designed so as to be able, during its operating phases alternating charging then discharging configuration, to regulate the duration of the discharging configurations so as to adjust its average input impedance over a given time interval to an optimum value.

An equivalent electrical circuit of the energy harvesting stage 110 is schematically shown in FIG. 2 with a voltage generator 101 delivering a voltage Vh, an inductor L and an output resistor Rs in series. The inductor L and the output resistor Rs are parameters which depend on the harvester used and which are typically known during the design of the interface electronic circuit.

The alternating electrical signal produced by this stage 110 is transmitted to the input terminals P, M of an interface electronic circuit 120 configured to convert this alternating signal into an output DC voltage $V_{OUT}$, which can be used by a charging stage 130-140.

The charging stage 130-140 is in particular provided with a means 130 for storing electrical energy. In the example illustrated, the electrical energy storage means 130 comprises a capacitor $C_{STORE}$. A battery can also be provided to perform this storage. In the illustrated exemplary embodiment, the means 130 for storing electrical energy is associated with another block 140 typically provided with an RF emitter 141. The block 140 can also be provided with other elements such as for example a microcontroller 142, a sensor interface circuit 143 for acquiring, by means of dedicated sensors, environmental information such as for example temperature, pressure.

The form of the signal delivered by the energy harvesting stage 110 in terms of frequency and amplitude reflects that of the excitation. The alternating signal at the input of the interface circuit 120 is thus typically formed of a succession of oscillations, which may possibly be of decreasing amplitudes in the particular case where the energy source at the origin of the creation of the oscillations is intermittent. The interface electronic circuit 120, according to a particular aspect, can be adapted to applications for which the amplitude of the signal delivered by the stage 110 is random with oscillation amplitudes which can vary from one use to another. This may be the case, for example, for an application of the "shock" type where the energy conversion follows an abrupt and sudden variation or else in the case where the conversion results from a continuous excitation including accelerations which vary from one half-wave to the other at the specific frequency of the harvester.

The interface electronic circuit 120 is typically implemented in the form of an ASIC (for "Application-Specific Integrated Circuit"), provided with various functional blocks as schematically shown on the exemplary embodiment given in FIG. 2.

The interface electronic circuit 120 firstly comprises a stage forming a converter. The converter can in particular be a rectifier or AC-to-DC converter, typically a rectifier 210 of the Graetz bridge type connected to the terminals P and M at the output of the first stage 110, and produced here by a bridge arrangement of four transistors. According to this particular illustrated exemplary embodiment, the rectifier includes 2 enhancement transistors, respectively of N type and of P type, provided with a gate connected to terminal M and a drain connected to terminal P, while two other enhancement transistors, respectively of N type and of P type, include a gate connected to terminal P and a drain connected to terminal M.

The interface electronic circuit 120 is here advantageously devoid of inductor between the output of the harvesting stage 110 and the storage means 130, which allows it to be less bulky and less expensive than an interface circuit using such a component.

The interface electronic circuit 120 includes a switch called "charge" switch 260, arranged between the first terminal P and the second terminal M and capable of alternately connecting or disconnecting the first terminal P and the second terminal M from each other, so as to short-circuit them. The charge switch 260 is typically provided with or formed with a transistor $M_{ON}$, which is alternately turned on or off depending on the level of a control signal $V_{MS}$ applied to its gate. In the illustrated exemplary embodiment, the transistor $M_{ON}$ is an N-type transistor. The control signal $V_{MS}$ can in particular be a logic signal produced by a stage 326 of a logic control block 320 belonging to the interface circuit 120.

The interface electronic circuit 120 is also provided with a switch called "discharge" switch 240 capable of alternately connecting or disconnecting the output of the rectifier 210 from the charge storage means 130. The "discharge" switch 240 is typically provided with or formed of a transistor $M_{OFF}$ which is alternately turned on or off depending on the level of a second control signal $V_{SR}$ applied to its gate. The transistor 241 may for example be a P-type enhancement transistor. The second control signal $V_{SR}$ is produced here by a stage 324 of the logic control block 320.

The interface electronic circuit 120 is capable of alternating between a charging configuration and a discharging configuration. The charging configuration is a configuration of the switches 240, 260 so as to disconnect the output of the rectifier from the charging stage 130-140 and that a charge current $I_{ON}$, intended to be detected, flows between the first terminal P and the second terminal M. The discharging configuration being a configuration of the switches 260, 240, so that the terminal P and the terminal M are disconnected from each other and the output of said rectifier 210 connected to the charging stage 130-140 receives a discharge current $I_{OFF}$ flowing through the switch 240 between the terminal P or M and the output of the rectifier 210 connected to the charging stage 130-140.

The control signals $V_{MS}$, $V_{SR}$ produced by the control block 320 are typically logic signals whose respective states depend on those of a charging configuration indicator signal $ST_{ON}$ produced by said logic control block 320 and on another discharging configuration indicator signal $ST_{OFF}$ also produced by said logic control block 320 and complementary to the signal $ST_{ON}$.

In particular, in a particular operating mode called "BOOST" operation, the interface electronic circuit 120 is capable of adopting a succession of phases during which it alternates several times between the charging configuration of the switches 240, 260 and the discharging configuration of the switches 240, 260.

The duration of the charging and/or discharging configuration is adjusted from one phase to another so as to obtain an improved extraction efficiency $\eta_e$. The implemented interface circuit 120 can allow a total power efficiency $\eta_T$ to be achieved ($\eta_T = \eta_e * \eta_c$, with $\eta_e$ the extraction efficiency, $\eta_c$ the conversion efficiency) which can be greater than 90%, over a wide range of input signals. This adjustment of the duration of the charging and/or discharging configuration can be carried out in particular by means of a generator block 380 configured to emit signals $T_{ONEND}$, $T_{OFFEND}$, able respectively to indicate the end of a charging configuration and the end a discharging configuration and to modify the state of the signals $ST_{ON}$, $ST_{OFF}$ used by the control block 320.

In this particular exemplary embodiment, the configuration change from a discharging configuration to a charging configuration can be triggered by an optimum input impedance detection signal $T_{OFFZM}$.

The state of the optimum input impedance detection signal $T_{OFFZM}$ itself depends on that of the signal $T_{OFFEND}$ produced by a regulation circuit (not shown in FIG. 2) belonging to the generator block 380 and on that of the discharging configuration indicator signal $ST_{OFF}$.

The regulating circuit of the generator block 380 aims at implementing a servo-control of the input impedance $R_{in}$ of the interface circuit 120 to an optimum value $R_{opt}$ corresponding to the maximum point of extracted power MPP (for "Maximum Power Point tracking"). Typically, the optimum value $R_{opt}$ is equal to $K_s * R_s$ with $K_s$ a predefined coupling coefficient which depends on the type of harvester used. The regulation circuit here more specifically implements a servo-control of a set of signals representative of an average value of input impedance of the interface circuit $\overline{Zin}$ to a predetermined optimum impedance value $R_{opt}$.

This average input impedance $\overline{Zin}$ can be expressed by equation (1) below, which depends on values of the average current $\overline{Ih}$ passing through the harvester and entering/leaving the terminals P and M, as well as on the average voltage $\overline{Vh}$ at the terminals of the internal equivalent voltage source 101 of the harvester and of the impedance Zh at the terminals of the voltage source 101.

$$\frac{\overline{Vh}}{\overline{Ih}} = \overline{Zh} = Zs + \overline{Zin} = Rs + \overline{Rin} \quad (1)$$

In the case where the frequency of the current Ih variation is relatively high, the component Lω is in practice negligible and for simplification the impedance Zs can be considered substantially equal to Rs. Similarly, the input impedance Zin of the interface circuit can be considered as almost only resistive and the equation (1) can be simplified.

The average current $\overline{Ih}$ and the average voltage $\overline{Vh}$ can, according to a first possible implementation, be expressed by means of the following equations (2) and (3):

$$\overline{Ih} * T = \int_0^T T_{ON} * I_{ON} + T_{OFF} * I_{OFF} dt \quad (2)$$

$$\overline{Vh} * T_{ON} = R_S \int_0^{T_{ON}} \frac{L}{R_S} * \frac{dI_{ON}}{dt} + I_{ON} dt \quad (3)$$

$$\overline{Vh} * T = (\overline{Vh} * T_{ON}) * \frac{T}{T_{ON}} \quad (3')$$

with $T_{ON}$ and $T_{OFF}$ corresponding to durations for which the charge 260 and discharge 240 switches are respectively conductive and conduct respective currents $I_{ON}$ and $I_{OFF}$. It will be noted that $I_H$ is then respectively equal to $I_{ON}$ or $I_{OFF}$ depending on whether either of the switches 260 or 240 are conducting. T corresponds to a period of alternating the conduction of the switches 260 and 240. Note that in equation (3) an average of the voltage Vh value is calculated only over a period $T_{ON}$ from the current $I_{ON}$ because this allows the electrical diagram to be simplified, avoiding having to take into account the value of the output voltage $V_{OUT}$ of the regulation circuit. To calculate an average voltage over the period T, it is considered here that the average value calculated over a period $T_{ON}$ is equal to that which would be obtained over a period $T=T_{ON} T_{OFF}$.

To establish the servo-control of the impedance $\overline{Zh}$ or of $\overline{Zin}$, the two terms being linked by a constant equal to the value of the resistor Rs, the electronic regulation circuit mentioned above produces signals which depend, on the one hand, on the average voltage $\overline{Vh}$ over a given time interval, and on the other hand, on an average current $\overline{Ih}$ of the harvester over said given time interval. It will be noted that the current Ih is accessible by measurement because it leaves/enters the harvester, unlike the voltage Vh which is internal to the harvester and cannot be directly measured. Based on the above equations, the voltage Vh will be estimated (on average) from the current Ih.

Figure 3:
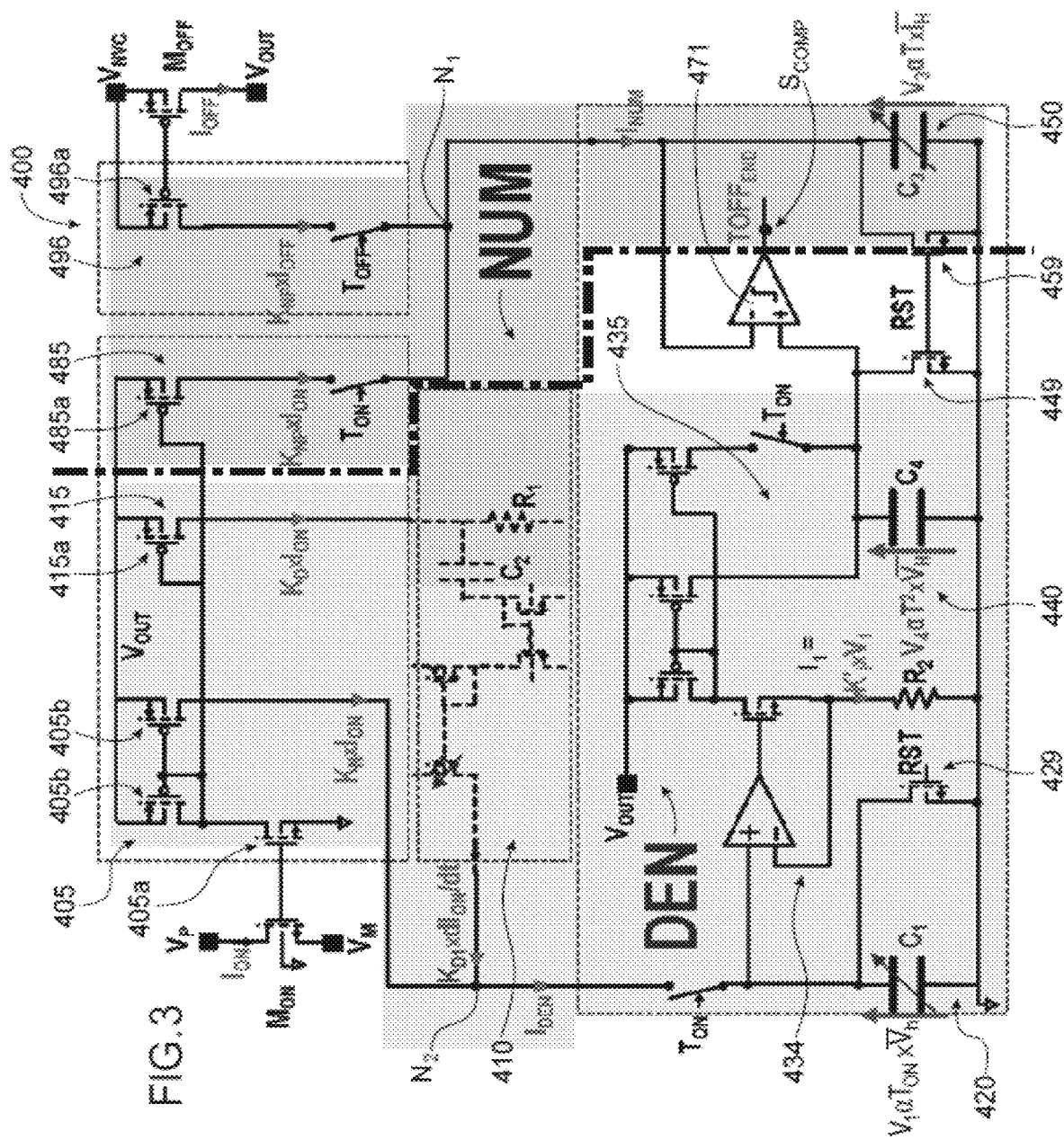
FIG. 3 is used to illustrate a first example of a regulation circuit for allowing regulation of the duration of discharging configurations according to a predetermined optimum value of input impedance of the interface circuit°.

A first embodiment of the regulation circuit 400 corresponding to the manner indicated above (in connection with equations (2) and (3)) of evaluating the average current $\overline{Ih}$ and the average voltage $\overline{Vh}$ is given in FIG. 3.

With a regulation circuit as described below, the respective durations $T_{ON}$, $T_{OFF}$ of charging and discharging configurations are adjusted by following the approximation given by the following equation (4), with $T=T_{ON}+T_{OFF}$:

$$\frac{\overline{Vh} * T^2}{\overline{Ih} * T} = \overline{Zh} * T = Zhopt * T = Rs(Ks + 1) * T \quad (4)$$

$$\frac{\overline{Vh} * T^2}{\overline{Ih} * T} * \frac{1}{Rs(Ks+1)} = T = TON + TOFF = \frac{NUM}{DEN} * T$$

where NUM is a value evaluated from a part denoted NUM of the regulation circuit 400 comprising stages 485, 496 and 450, where DEN is a value evaluated from a part DEN of the circuit comprising stages 405, 415, 420, 440. In other words, it is desired to achieve a servo-control of the impedance Zh to an optimal value Zhopt, which amounts to servo-controlling Rin to an optimal value Ropt. For this purpose, it is typically desired to obtain a ratio NUM/DEN equal to 1, that is to say by trying to equalise a voltage $V_4$ allowing to evaluate the term DEN given above and the voltage $V_3$ allowing to evaluate the term NUM.

The regulation circuit 400 is, in this example, provided with stages 405, 415, 485, for copying the charge current $I_{ON}$, as well as a stage 496 for copying the discharge current $I_{OFF}$. The regulation circuit 400 is also provided with current integrator stages 420, 440, 450. A stage 410 for differentiating current and in particular a copy $K_D*I_{ON}$ of the current $I_{ON}$ can also be provided.

To servo-control the input impedance $\overline{Zin}$, the regulation circuit 400 produces signals $V_1$, $V_4$ which depend respectively on a product $(\overline{Vh})*T_{ON}$ and on a product $(\overline{Vh})*T^2$ and which are thus representative of the average voltage value $\overline{Vh}$ during a time interval. The average voltage $\overline{Vh}$ is extracted in this example, in accordance with the equation (3') using the charge current $I_{ON}$ copies. The regulation circuit also produces a signal $V_3$ which depends on the product $(\overline{Ih})*T$ during the time interval T. This average current $(\overline{Ih})$ during the time interval T. This average current $\overline{Ih}$ is extracted in this example according to equation (2) using a copy of the charge current $I_{ON}$ and a copy of the charge current $T_{OFF}$.

The signal $V_3$ is a voltage taken at the terminals of an integration capacitor $C_3$ of a current integration stage 450. The integration capacitor $C_3$ is charged from a current called "numerator" current $I_{NUM}$ in this example equal to the sum of a current $K_{NP}*I_{ON}$ copy of the charge current $I_{ON}$ for the duration $T_{ON}$ of a charging configuration and another current $K_{NP}*I_{OFF}$ resulting from a copy of the discharge current $I_{OFF}$ during the duration $T_{OFF}$ of a discharging configuration. The current $K_{NP}*I_{ON}$ is obtained from a current $I_{ON}$ copy stage 485 passing through the charge switch and which can be provided with at least one transistor 485a current-mirror-mounted with the charge transistor $M_{ON}$. The current $K_{NP}*I_{OFF}$ can be obtained from a current $I_{OFF}$ copy stage 496 passing through the discharge switch and which can be provided with a transistor 496a current-mirror-mounted with the discharge transistor $M_{OFF}$.

A circuit branch producing the numerator current $I_{NUM}$ is connected to a node $N_1$ in turn coupled alternately with the stage 485 during a charging configuration and with the stage 496 during a discharging configuration.

The voltage $V_1$ is taken at the terminals of an integration capacitor $C_1$ of a current integration stage 420. The integration capacitor $C_1$ is charged from a current called "denominator" current $I_{DEN}$ composed of a current $K_N*I_{ON}$ copy of the charge current $I_{ON}$ and another current $K_{D1}*dI_{ON}/dt$ produced by a differentiator stage 410 from a current $K_D*I_{ON}$ emitted at the input of this differentiator stage 410 and in turn resulting from a copy of the charge current $I_{ON}$.

In this example, the differentiator stage 410 is schematically shown by a resistor $R_1$ and a capacitor $C_2$.

The current $K_{NP}*I_{ON}$ is obtained from a current $I_{ON}$ copy stage 405 which can be formed of transistors 405a, 405b, 405c, 405d current-mirror-mounted with the charge transistor $M_{ON}$. The current $K_D*I_{ON}$, in turn, comes from a stage 415 which can be provided with a current-mirror-mounted transistor 415a.

The integration capacitor $C_1$ is coupled to a stage 434a producing a voltage-to-current converter formed in this example using an amplifier 434a. The voltage-to-current conversion stage 434 allows to produce a current $I_1=K'_1 V_1$ proportional to the voltage $V_1$.

A copy of the current $I_1$ is produced by a current copy stage 435 and allows to charge the capacitor $C_4$ of an integration stage 440 and to change the voltage $V_4$ at the terminals of this capacitor $C_4$. It will be noted in practice, that the stage 435 has two copy branches pouring current into capacitor $C_4$. One of the branches is activated for the entire period T (of duration $T_{ON}+T_{OFF}$, in practice between two capacitor resets or discharges) and the other branch is activated only during the period $T_{ON}$. This other branch is designed to overcome the transient regime for establishing voltage $V_1$ by multiplying the current charging capacitor $C_4$ by 2, for the duration $T_{ON}$.

A comparison between the voltage $V_4$ and the voltage $V_3$ is carried out by means of a comparator 471 which is able to produce at the output, according to this comparison, the indicator signal $T_{OFFEND}$. Note that the output of the comparator 471 gives an evaluation of the ratio NUM/DEN indicated above in equation (4). Thus, by observing the output of this comparator 471 it can be evaluated whether the average input impedance of the interface circuit is greater or less than the optimum value. If the value of NUM is greater than that of DEN, the input impedance Zin is greater than Zopt and vice versa.

The duration of a charging configuration $T_{ON}$ is here a multiple of a predetermined minimum period $T_{ONMIN}$, which is programmable and provided for example for a particular application between 8 μs and 50 μs. For this purpose, the interface circuit illustrated in FIG. 2 can be provided with a delay block 290 indicating the expiration of the minimum duration of the charging configuration which, after receiving a charging configuration start signal $T_{ONMINSTR}$, generates after a fixed and programmed delay, a signal $T_{ONMIND}$ indicating the expiration of the minimum charging configuration time to the generator block 380.

When a charging configuration of the harvester inductor starts, the charge switch 260 is closed ($M_{ON}$ in the 'ON' state, i.e. turned on) and the discharge switch 240 is open ($M_{OFF}$ to in the 'OFF' state, i.e. turned off), the integration capacitors $C_4$ and $C_3$ are charged from respective currents obtained from copies of a current $I_{ON}$ of the charge transistor $M_{ON}$ during a first period $T_{ONMIN}$. The voltage $V_4$ at the terminals of $C_4$ and the voltage $V_3$ at the terminals of $C_3$ are then compared by means of the comparator 471.

If the voltage $V_4$ is greater than the voltage $V_3$, the comparator 471 produces at the output $S_{COMP}$ a signal for example corresponding to a logic state '1'. The state of this output $S_{COMP}$, which depends on the difference $V_4-V_3$, is detected and provides information on an input resistor value regulated relative to a setpoint Ropt. In this example, a state '1' at the output $S_{COMP}$ of the comparator 471, at the instant when the period $T_{ONMIN}$ has expired, means that the input impedance value is too high relative to the value Ropt. A discharge phase which would tend to further increase this input impedance is therefore not triggered. The interface circuit is then maintained in a charging configuration.

In this case (where evaluated Zin>Zopt after a duration $T_{ONMIN}$), at the end of the period $T_{ONMIN}$, the integration capacitors $C_3$, $C_4$, $C_1$ are emptied respectively by means of reset stages 459, 449, 429. These reset stages 459, 449, 429 are typically formed of a transistor connected to the terminals of the integration capacitor $C_3$, $C_4$, $C_1$ and whose gate is controlled by a reset signal RST. In the example shown, the reset is performed when the signal RST is set to a value corresponding to a logical '1'.

The charging configuration is then extended by a new minimum period $T_{ONmin}$. If, at the end of this duration, the voltage $V_4$ is less than the voltage $V_3$, the comparator 471 produces at the output $S_{COMP}$ a signal in this example corresponding to a logic state '0' caused to trigger a passage in a discharging configuration. The generator 380 then produces a signal $T_{ONEND}$ to the control block 320.

The discharging configuration where the switch 260 is then open ($M_{ON}$ in the 'OFF' state, i.e. turned off) and the switch 240 is closed ($M_{OFF}$ in the 'ON' state, i.e. turned on), results in a reduction of the current $I_H$ in the inductor L of the harvester.

In the discharging configuration, when the voltage $V_4$ reaches and exceeds the value of the voltage $V_3$, the comparator 471 produces at the output an indicator signal $T_{OFFend}$ of the end of the discharging configuration which switches to a state corresponding in this example to a logic state '1'. This signal $T_{OFFend}$ at the output of the comparator 471 allows to modify the signal $T_{OFFZM}$ indicating the optimum average input impedance and to indicate to the control block 320 that the discharging configuration is terminated. The average input impedance is then equal to the value Ropt for a time interval of duration $T=_{ON} min+T_{OFF}$.

By detecting the difference between voltage $V_4$ and voltage $V_3$, it is then detected that a ratio between the average voltage $\overline{Vh}$ and the average current $\overline{Ih}$ over a given time interval reaches the predetermined optimum value Ropt.

Figure 4:
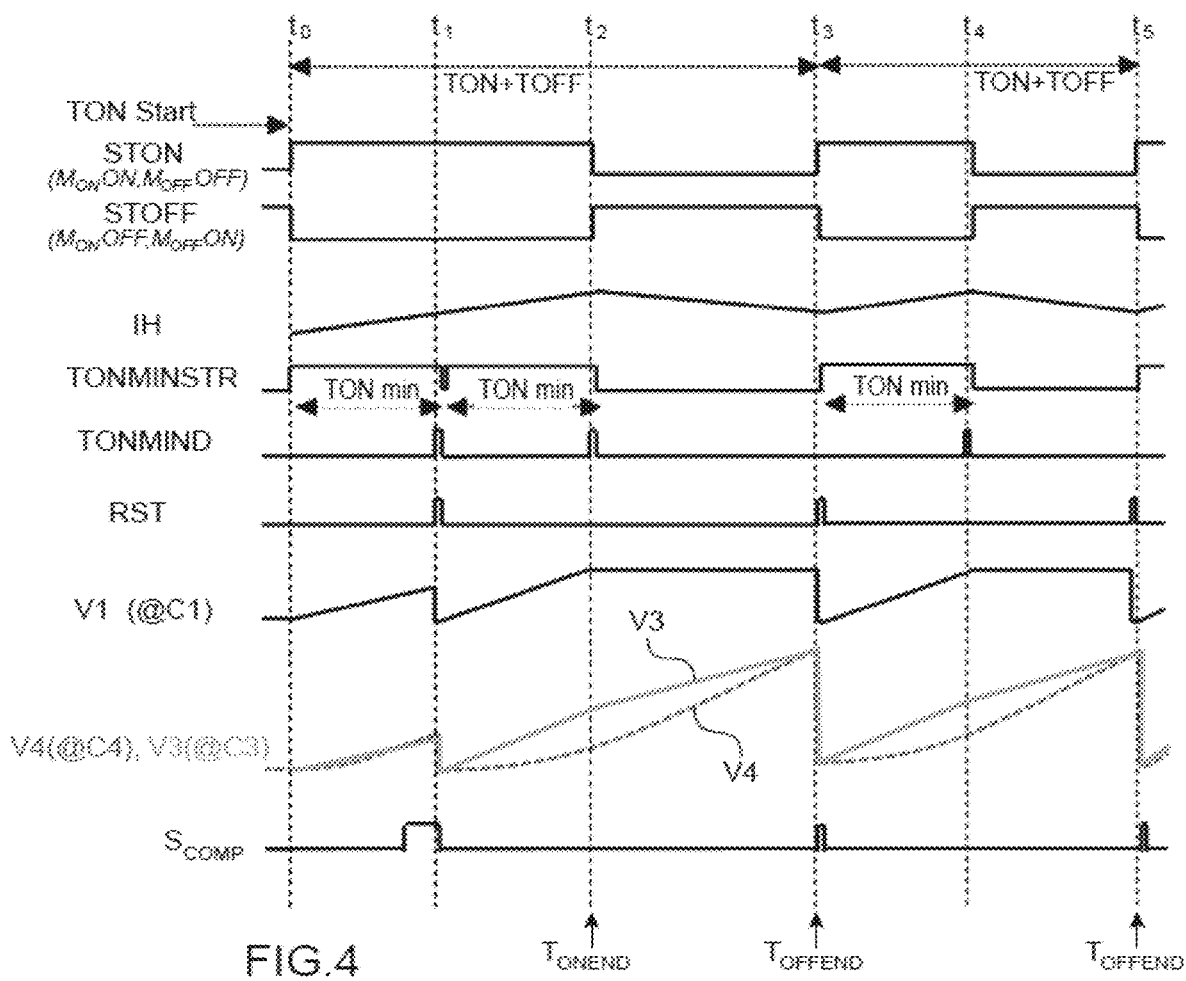
FIG. 4 is used to illustrate a sequence of signals implemented within a logic control block of the interface electronic circuit and a generator block comprising the first example of a regulation circuit°.

An example of the sequencing of signals $ST_{ON}$, $ST_{OFF}$, $T_{ONMINSTR}$, $T_{ONMIND}$, used by the generator block 380 of the signal $T_{OFFEND}$ produced by this generator block 380 and of signals $V_1$, $V_3$, $V_4$, $S_{COMP}$ produced by the regulation circuit are given in FIG. 4.

At an instant $t_0$, a new charging configuration starts, which results in a setting to a state '1' of the charging configuration indicator signal $ST_{ON}$. The current $I_H$ in the harvester inductor then increases. The voltage $V_4$ becomes greater than the voltage $V_3$, which causes a change of state of the signal produced at the output $S_{COMP}$ of the comparator 471 which switches here to a state T. At a detection instant $t_1$ after the expiration of a minimum period $T_{ONmin}$ of the charging configuration, the state '1' of the signal $T_{OFFEND}$ means that the average impedance seen by the harvester is greater than a setpoint value Ropt. At the instant $t_1$, the emptying of the integration capacitors is triggered. From this instant $t_1$, the charging configuration is then continued for at least a new minimum period $T_{ONmin}$. A new current integration is thus carried out at the capacitors $C_1$, $C_3$, $C_4$.

At an instant $t_2$ once a new period $T_{ONmin}$ has expired, the voltage $V_4$ at the terminals of the capacitor $C_4$ is less than the voltage $V_3$ at the terminals of the capacitor $C_3$, which results in an output $S_{COMP}$ of the comparator 471 in a state '0' meaning that a discharging configuration can be carried out this time between the instants $t_2$ and $t_3$.

Then, a switching of the output $S_{COMP}$ of the comparator 471 at instant $t_3$ indicates the end of the discharging configuration by means of a change of state of the output $S_{COMP}$ producing the signal $T_{OFFEND}$ to '1'. The average input impedance between instants $t_3$ and $t_1$ is then equal to the value Ropt, and a new phase alternating a charging then a discharging configuration can be implemented.

To trigger a new phase (alternation of a charging then discharging configuration) from the signal $T_{OFFEND}$ produced at the output of the regulation circuit 400, the control block 320 uses a signal $T_{OFFZM}$ for detecting the optimum average input impedance produced by means of a stage 382. This stage 382 is arranged at the output of the generator block 380 and also receives the discharging configuration indicator signal $ST_{OFF}$. The stage 382 is provided with at least one logic gate, in this example a logic gate performing an AND function between the discharging configuration indicator signal $ST_{OFF}$ and the signal $T_{OFFEND}$ produced at the output of the comparator.

In the exemplary embodiment of the interface circuit illustrated in FIG. 2, the logic control block 320 is configured to modify the state of the signal $ST_{ON}$ indicating the charging configuration and of the other signal $ST_{OFF}$ indicating the complementary discharging configuration of the latter, depending on the respective states of the inputs R and S of a flip-flop 337. The input RESET is here dependent on the respective states of the signal $ST_{ON}$ and of a signal $T_{ONEND}$. The signal $T_{ONEND}$ is produced by the generator 380 when in the charging configuration, when $V_3 > V_4$ (which in this example results in $S_{COMP}=0$), and when at least one predetermined minimum period $T_{ONmin}$ has expired. The input SET of the flip-flop 337 is in turn dependent on the respective states of the signals $ST_{OFF}$, $T_{OFFZM}$.

In the exemplary embodiment which has just been described of the generator block 380 and of the associated regulation circuit 400, the duration $T_{ON}$ of the charging configurations is here the multiple of a predetermined minimum period $T_{ONmin}$, while the duration $T_{OFF}$ of the discharging configurations is here variable and has an end indicated only by the switching at the output of the comparator 471, without this end depending on a minimum duration of discharging configuration.

Values of the coupling coefficient $K_S$, of inductor L, of resistor $R_s$ which are specific to the harvester and which determine a setpoint value $R_{opt}$, are used to determine parameters of the regulation circuit 400. The predetermined minimum period $T_{ONmin}$ is also fixed depending on the type of harvester used.

The gain parameters $K_{NP}$ of the current copy stages 485, 496, $K_N$ of the current copy stage 405, $K_D$ of the current copy stage 415, $R_1$ and $C_2$ of the current differentiator stage 410, $C_4$ of the integrator stage $C_4$ are defined during the design of the regulation circuit 400, preferably so that:

$$C_1/C_3=((Ks \div 1)*T_{ONmin}*K_{NP})/(K_N*R_2*C_4) et K_{D1}= (L*K_D)/(Rs*K_N*R_1*C_2)$$

A variant embodiment of the generator block of the signal $T_{OFFend}$ and of its associated regulation circuit can be provided to allow the start-up time of the differentiator stage 410 to be taken into account when the servo-control is carried out. This time a servo-control of the average input impedance $\overline{Zh}$ is implemented on the basis of equations (1), (3) as given previously, and the equation (2)' below replacing equation (2) of the first embodiment.

$$\overline{Ih}*T = \int_0^T T_{ON}*\left(I_{ON} - \frac{1}{2}*T_{ON}*\frac{dI_{ON}}{dt}\right) + T_{OFF}*I_{OFF} dt \quad (2)'$$

To overcome the problem of estimating the start-up time of the differentiator stage 410, a charging configuration is imposed during a first period of minimum duration $T_{ONmin}$ to allow an adequate start-up and polarisation of the differentiator stage 410, without using the output of the comparator 471 to evaluate where the value of the input resistor is located relative to a setpoint value.

At the end of this first imposed minimum duration $T_{ONmin}$, the output $S_{COMP}$ of the comparator 471 is therefore not taken into account and regardless of the state of the signal at the output of this comparator 471, the charging configuration is continued for a new period of duration $T_{ONmin}$.

At the end of this second period $T_{ONmin}$, the output $S_{COMP}$ of the comparator 471 is this time taken into account, the state of the output signal indicating whether the charging configuration is maintained according to another period equal to $T_{ONmin}$ or the interface circuit must be set in a discharging configuration. In this case, the signal $T_{ONEND}$ is produced by the generator 380 to the control block 320 which triggers the change of configuration.

The equation (2)' given above and which is estimated from the voltage $V_3$ which charges from the current $I_{NUM}$ includes this time a new term: ($\frac{1}{2}*T_{ON}*(dI_{ON}/dt)$). The function of the inclusion of this new term is to ensure that here an average current Ih is measured which is that of the period comprised between $t_0$ and $t_3$, and that when the operating phases are carried on (a phase having a duration equal to at least one charge period $T_{ON}$ to which is added a discharge period $T_{OFF}$) that an evaluation of the average current is carried out without omitting a value of Ih during the first time interval $T_{ONmin}$ located between $t_0$ and $t_1$.

Figure 5:
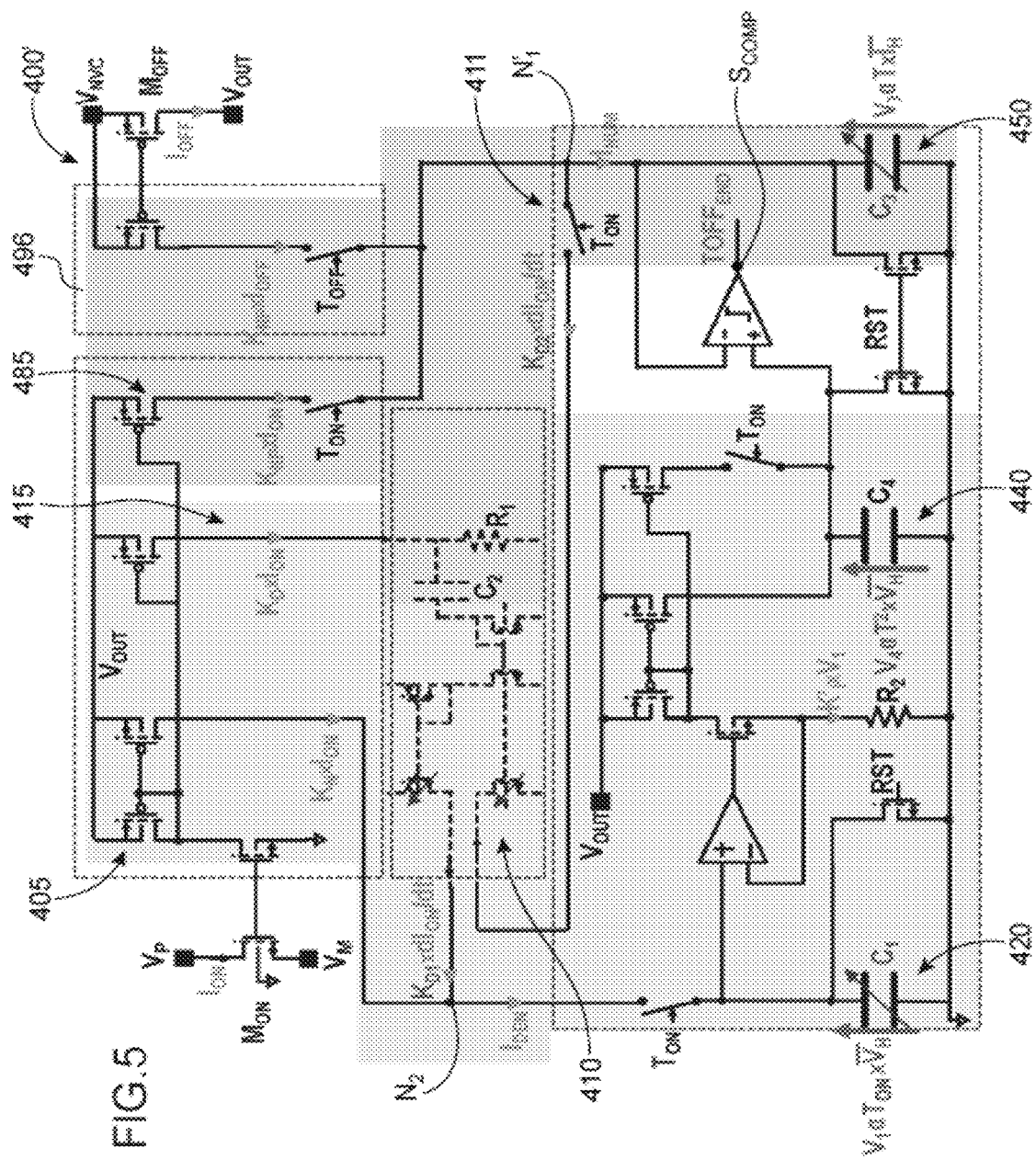
FIG. 5 is used to illustrate a variant embodiment of the regulation circuit allowing to take into account the start-up of a differentiator stage°.

FIG. 5 illustrates an example of a regulation circuit architecture for the implementation of such a variant. An additional branch 411 connected to the integrator stage 410 is provided this time. This branch 411 is, for a period of a charging configuration, able to be coupled to the node $N'_1$ to which the branch producing the numerator current $I_{NUM}$ is connected. Thus a new component ($K_{d2}*(dI_{on}/dt)$) is subtracted from the numerator current $I_{NUM}$. The new term of equation (2)' is thus taken into account in the signal $V_3$ resulting from the integration of the numerator current $I_{NUM}$.

Figure 6:
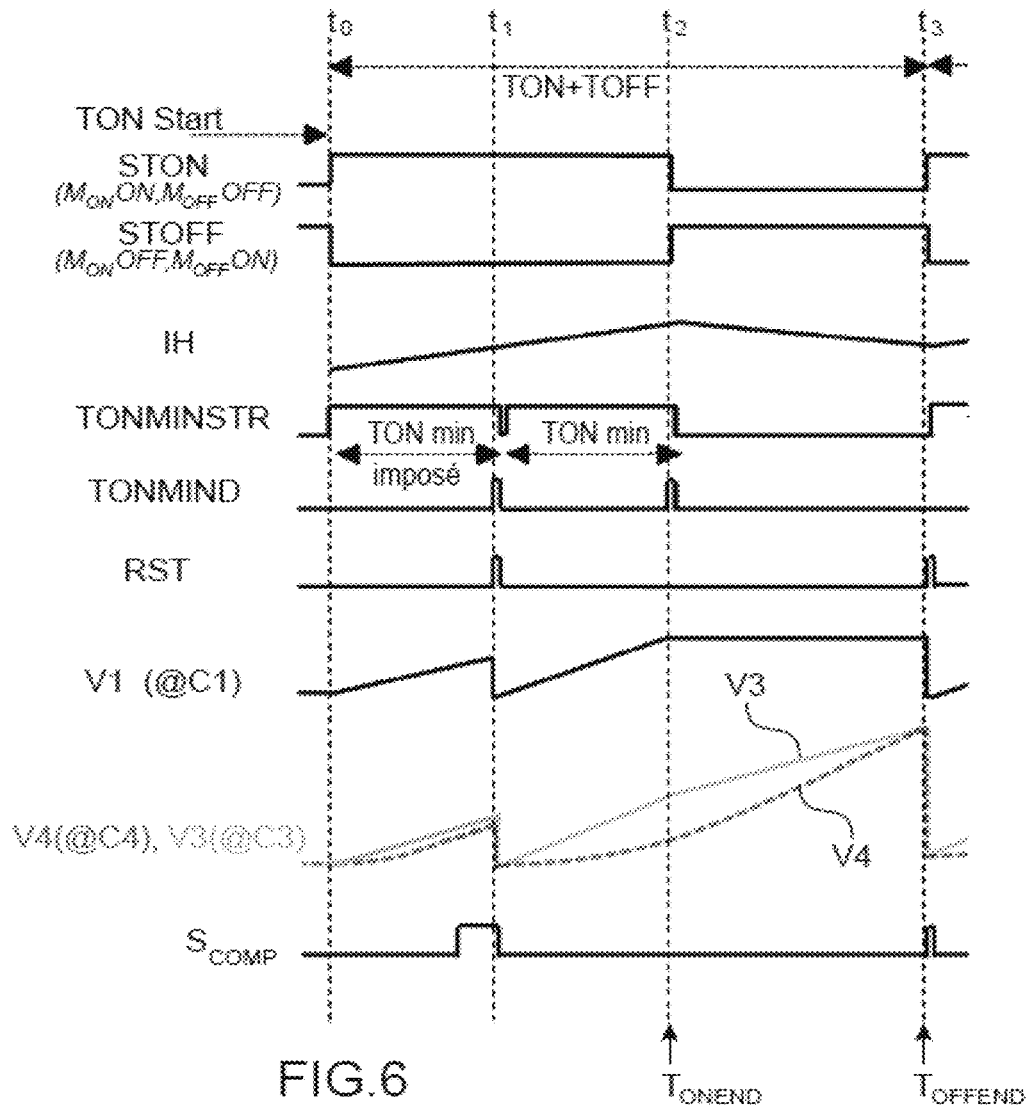
FIG. 6 is used to illustrate a sequence of signals within a logic control block of the interface electronic circuit adapted for this variant°.

A sequence of signals used and/or produced by the generator unit 380 and the regulation circuit corresponding to this variant embodiment is given in FIG. 6.

At an instant $t_1$ after the expiration of the minimum imposed period $T_{ONmin}$, the output $S_{COMP}$ of the comparator 471 indicating the result of the comparison between the signals $V_3$ and $V_4$ is not taken into account and the charging configuration then continues for a new period $T_{ONmin}$ to an instant $t_2$. At this instant $t_2$, the output $S_{COMP}$ of the comparator 471 is in a state for example '0' indicating that $V_4 < V_3$. A detection of this state has the consequence, as in the previous exemplary embodiment, of triggering a change of configuration so that the circuit passes into a discharging configuration. This configuration is then maintained until an instant $t_3$ when a change of state at the output of the comparator 471, for example, which passes to a level '1' indicating that $V_4 > V_3$, is detected and marks the stop of the discharging configuration and the passage to another phase starting with a charging configuration.

It will be noted that in the exemplary embodiments previously described, the capacitors $C_1$, $C_4$ and $C_3$ are reset, via the signal RST, before restarting a new period $T_{ONMIN}$. In this way, the duration T used in the formulas indicated above corresponds to the accumulation of a duration $T_{ON}=T_{ONMIN}$ and a duration $T_{OFF}$. In other words, if the duration $T_{ON}$ was taken to be equal to a number greater than 1 of period $T_{ONMIN}$, to take into account a control logic and an implementation different from those described, by not imposing a reset via the signal RST before any new period of $T_{ONMIN}$, the equations should be adapted accordingly.

In the exemplary embodiments described above, provision is made of charging configurations of a duration equal to a multiple of a minimum duration predetermined and programmed within the interface electronic circuit, while the duration of the discharging configurations can be modulated more precisely depending on the instant when a setpoint is reached.

It is alternatively possible to achieve the servo-control of the average impedance $\overline{Zh}$ this time having discharging configurations of a duration equal to a multiple of a predetermined minimum duration, while the duration of the charging configurations is adjusted more finely and lasts the time necessary for the regulation circuit to reach a setpoint value corresponding to a detection by the comparator 471 of a condition on the difference between the signals $V_4$ and $V_3$.

For this variant, the average current $\overline{Ih}$ and the average voltage $\overline{Vh}$ are this time evaluated by means of signals representative of the following equations (3) and (4).

$$\overline{I_H}T = \int_0^T T_{ON}I_{ON} + T_{OFF}I_{OFF}dt \quad (3)$$

$$\overline{Vh} * T_{OFF} = R_S \int_0^{T_{OFF}} \frac{L}{R_S} * \frac{dI_{OFF}}{dt} + \frac{V_{OUT}}{R_S} + I_{OFF}dt \quad (4)$$

$$\overline{Vh} * T = (\overline{Vh} * T_{OFF}) * \frac{T}{T_{OFF}} \quad (4')$$

The current Ih is thus expressed in a manner similar to what has been described previously.

This time the voltage Vh of the harvester is averaged over a discharge time $T_{OFF}$. A term of the equation (4) depends on the output voltage $V_{OUT}$ of the interface circuit in other words at the terminals of the storage element and requires the introduction of an additional stage in the regulation circuit compared to the exemplary embodiments described above. This additional stage is typically provided with a voltage-to-current converter and is configured to produce an image current of the output voltage $V_{OUT}$ of the interface circuit.

Figure 7:
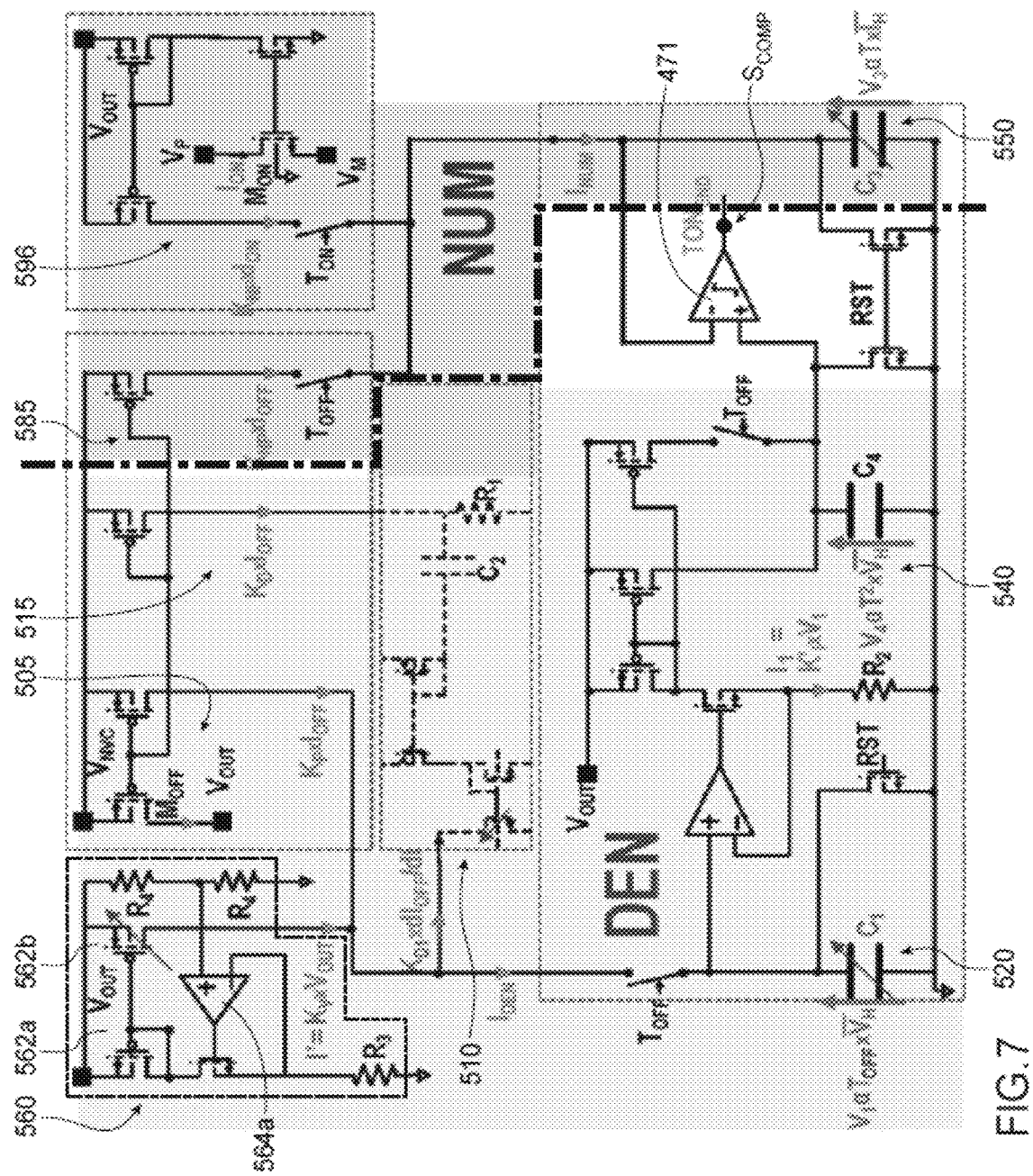
FIG. 7 is used to illustrate a particular embodiment of an interface electronic circuit between an energy harvesting stage and an energy storage means, the interface electronic circuit being designed so as to be able, during its operating phases alternating charging then discharging configuration, to regulate the duration of the charging configurations, so as to adjust its average input impedance to an optimum value°.

An exemplary embodiment of the regulation circuit 500 associated with this variant is given in FIG. 7.

The regulation circuit 500 is in this example provided with discharge current $I_{OFF}$ copy stages 505, 515, 585, and a charge current $I_{ON}$ copy stage 596. The regulation circuit 500 is also provided with current integrator stages 520, 540, 550 as well as a current differentiator stage 510, and in particular for producing an image current of a derivative of a discharge current $I_{OFF}$ copy.

The average current Ih is extracted in this example, in accordance with the equation (3) through the integration capacitor $C_3$ which is charged from the current called "numerator" current $I_{NUM}$ equal to the sum of a current $K_{Np}*I_{ON}$ copy of the charge current $I_{ON}$ for a duration $T_{ON}$ of a charging configuration and another current $K_{NP}*I_{OFF}$ resulting from a copy of the discharge current $I_{OFF}$ during the duration $T_{OFF}$ of a discharging configuration. The current $K_{NP}*I_{ON}$ is obtained from a stage 596 for copying the current $I_{ON}$. The current $K_{Np}*I_{OFF}$ can be obtained from a stage 585 for copying the current $I_{OFF}$.

The voltage $V_1$ taken at the terminals of the integration capacitor $C_1$ depends on a denominator current $I"_{DEN}$ which is, in this example, composed this time of a current $K_P*I_{OFF}$ at the output of the discharge current $I_{OFF}$ copy stage 505, of another current $K_{D1}*dI_{OFF}/dt$ at the output of the differentiator stage 510, and of a current $I"=K_V*V_{OUT}$ at the output of a voltage-to-current converter stage 560. This stage 560 is configured to convert the output voltage $V_{OUT}$ of the interface circuit into a current $I"=K_V*V_{OUT}$. The voltage-to-current converter stage 560 comprises, in the illustrated example, an amplifier 564, which can be coupled to resistors $R_3$ and $R_4$ as well as current-mirror-mounted transistors 562a, 562b.

In this exemplary embodiment, the circuit 500 is provided with a comparator 471 this time producing at the output $S_{COMP}$ a signal $T_{ONEND}$ capable of indicating the end of a charging configuration, when in charging configuration, the difference $V_4$–$V_3$ indicates that the value $R_{OPT}$ has been reached.

Figure 8:
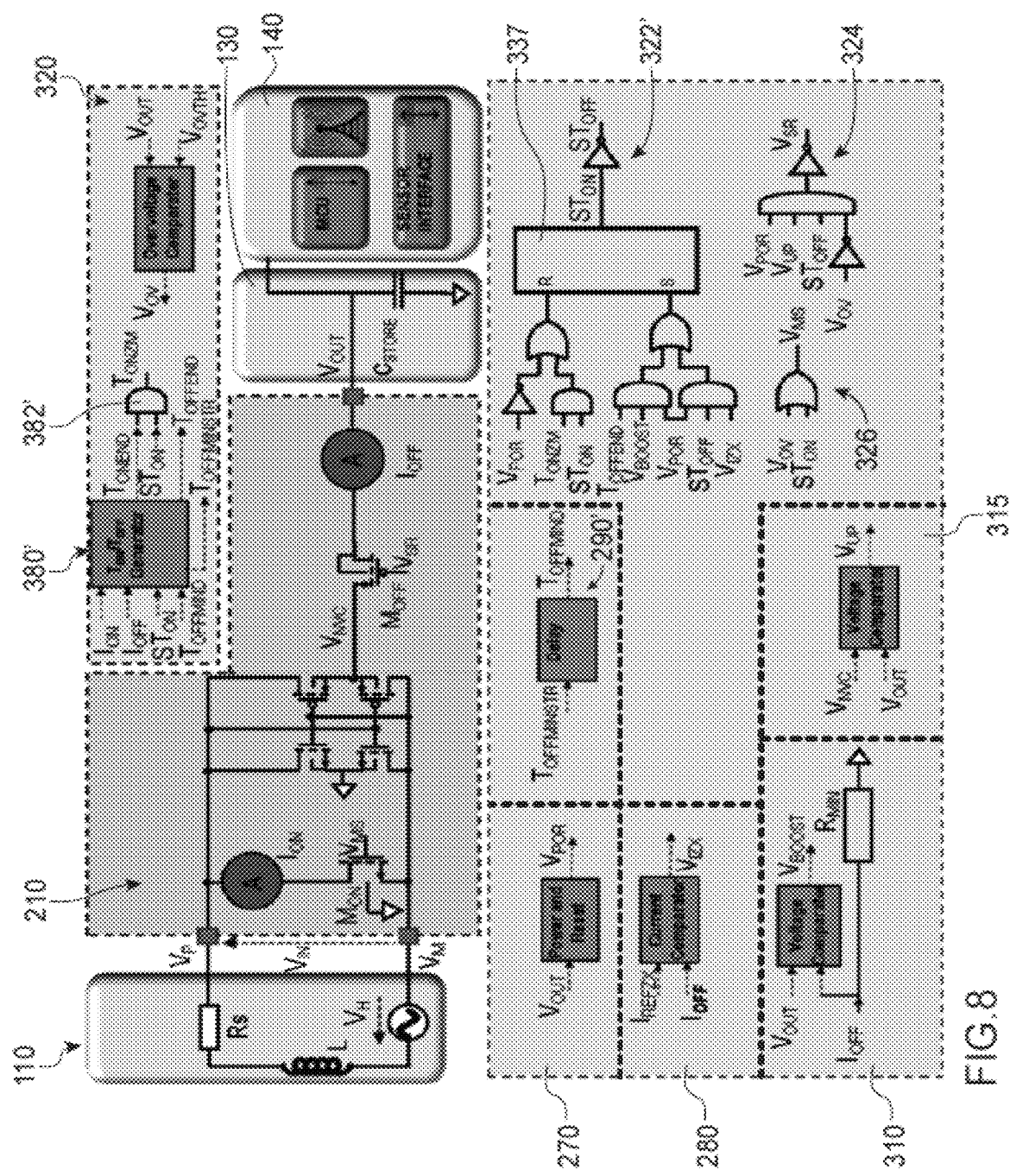
FIG. 8 is used to illustrate another example of a regulation circuit for allowing the regulation of the duration of charging configurations°.

In the example illustrated in FIG. 8 of an embodiment of the interface circuit, the end of a charging configuration is effectively triggered by the control block 320 using a signal $T_{ONZM}$ indicating the optimum average input impedance, the state of which depends on the charging configuration indicator signal $ST_{ON}$ and the signal $T_{ONEND}$ here indicating a switching at the output of the comparator 471.

The block 320 this time includes a stage 322' with a flip-flop 337 whose input RESET is dependent on the respective states of the signal $ST_{ON}$ indicating the charging configuration and $T_{ONZM}$ indicating the optimum average input impedance.

This variant of the regulation circuit allowing to servo-control the input impedance has, compared with the previous examples of FIGS. 3 and 5, the constraint of being bulkier and more consuming, in particular due to the voltage/current converter 560 which adds occupied space and static consumption.

In either of the exemplary embodiments which have been described above, the control block 320 allowing to generate the control signals $V_{MS}$, $V_{SR}$ of the switches typically comprises, as illustrated in FIG. 2 or in FIG. 7, a plurality of stages 322, 324, 326, or 322', 324, 326 formed of logic components used in combinatorial and/or sequential logic. Stages 324, 326 are in particular provided with one or more logic gates 338, 339, 340, 342, while the stage 322 or 322' is formed of logic gates 331, 332, 333, 334, 335, 336, 341 and at least one element such as a flip-flop 337 capable, under certain circumstances, of maintaining the values of its output(s) despite changes in input value(s).

In the exemplary embodiments illustrated in FIGS. 2 and 7, the logic state '0' or '1' of the control signal $V_{MS}$ of the charge switch 260 is produced by a stage 326 and here depends on that of the charging configuration indicator signal $ST_{ON}$ and an overvoltage detection signal $V_{OV}$ applied at the input of this stage 326.

The overvoltage detection signal $V_{OV}$ can be produced by a stage 320 for detecting overvoltages of said voltage $V_{OUT}$ at the terminals of the charge storage means $C_{STORE}$. The overvoltage detection stage 320 may be provided with a comparator configured to compare said voltage $V_{OUT}$ at the terminals of said charge storage means with a predetermined threshold voltage $V_{OVTH}$.

The control signal $V_{SR}$ is in turn produced by a stage 324 of the logic control block 320 and has a logic state which here depends on that of a threshold detection signal $V_{POR}$, of another detection signal $V_{UP}$, and of the discharging configuration indicator signal $ST_{OFF}$, as well as of the overvoltage detection signal $V_{OV}$.

The detection signal $V_{UP}$ can come from a detection stage 315 provided with a comparator 316, able to compare the output voltage $V_{OUT}$ applied to the electrical charge storage means 130 and a voltage $V_{NVC}$ at the output of the rectifier 210, and produce a comparison signal $V_{UP}$ indicating, for example when $V_{UP}$ is in a logic state '1' when the voltage $V_{NVC}$ at the output of the rectifier 210 exceeds the output voltage $V_{OUT}$.

In the illustrated example, the interface circuit 120 is also provided with a block 270 for detecting the minimum value of the output voltage $V_{OUT}$, able to detect an exceeding of this voltage $V_{OUT}$ applied to the electrical charge storage means 130 of the minimum threshold value and when this detection is performed, produce the threshold detection signal $V_{POR}$ to the control block 320.

An interface electronic circuit 120 corresponding to either of the embodiments described above can, in addition to the "Boost" mode mentioned above, adopt a different operating mode which is called "linear" operating mode. This linear mode is established in particular when the output capacitor $C_{STORE}$ is discharged or when, compared to an output voltage $V_{OUT}$ taken at the terminals of this capacitor $C_{STORE}$, the voltage supplied by the harvester 110 is too high between the terminals P and M. This linear operating mode may typically be favoured over some portions of the first half-waves, having a greater amplitude, of the signal delivered by the harvester 110 when the latter is in intermittent operation.

A passage from linear operating mode to Boost operating mode can be achieved when a voltage equal to the product $R_{MIN}*I_{OFF}$ of a discharge current intended for the capacitor $C_{STORE}$ disposed at the output of the interface circuit 120 by a resistor of predetermined value $R_{min}$ becomes less than the output voltage $V_{OUT}$ at the terminals of the capacitor $C_{STORE}$. In this case, where $V_{OUT} \geq R_{min}*I_{OFF}$, the "Boost" operating mode can be adopted.

The interface circuit 120 may be provided with an operating mode detection block 310. This block 310 is typically provided with a comparator 311 to compare the output voltage $V_{OUT}$ to the product $R_{min}*I_{OFF}$ and to produce at the output the signal $V_{BOOST}$ which can allow a passage to the "Boost" operating mode to be triggered.

In either of the described exemplary embodiments, the interface circuit may also further comprise a minimum current detection stage 280. This stage can be provided with a current comparator 281, to compare the current $I_{OFF}$ with a threshold current. The minimum current detection signal $V_{IZX}$ intended for the control block 320 at the output of the comparator 321 indicates, by a change of state, for example set to a logic level '1' when the current $I_{OFF}$ goes below this threshold.

A regulation circuit as described in either of the previously described embodiments allows to regulate the average impedance seen by the harvester at the optimum impedance Ropt.

This allows to improve the extraction efficiency over a wide power range (i.e. a wide harvester acceleration range) and also over a wide range of output voltage $V_{OUT}$ of the interface circuit.

Figure 9:
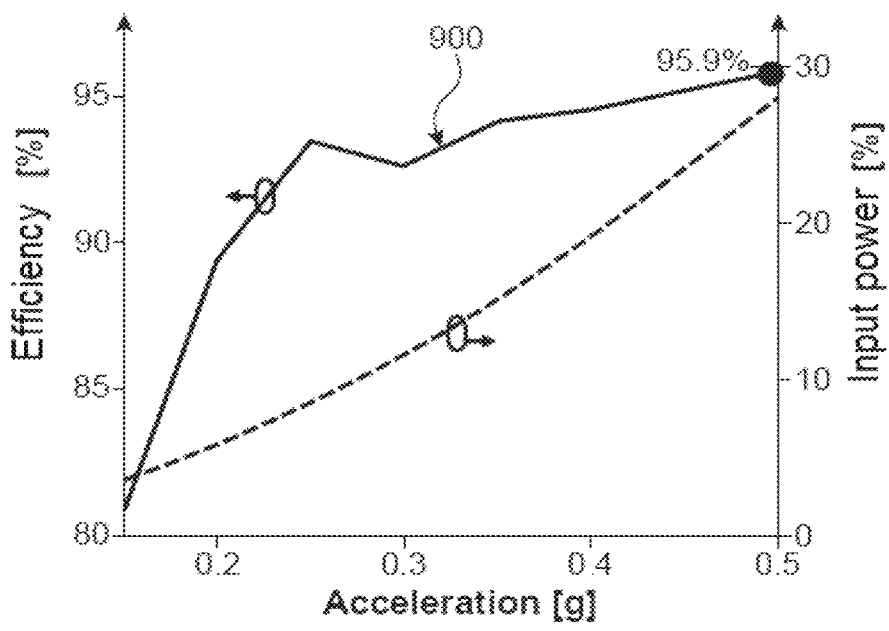
FIG. 9 is used to illustrate the performance in terms of efficiency of an interface circuit as implemented according to the invention°.

The architecture proposed above and allowing to pass from a linear mode to a "boost" mode also brings an excellent conversion efficiency, to reach a total efficiency which can be greater than 90%. FIG. 9 gives, by way of example, an efficiency curve 900 obtained with an interface circuit coupled to an electromagnetic harvester having parameters Ks=4.4, Rs=34 ohm, Ls=2 mH over an acceleration range of 0.2 g at 0.5 g in continuous excitation mode at a frequency of 48 Hz.

Figure 10:
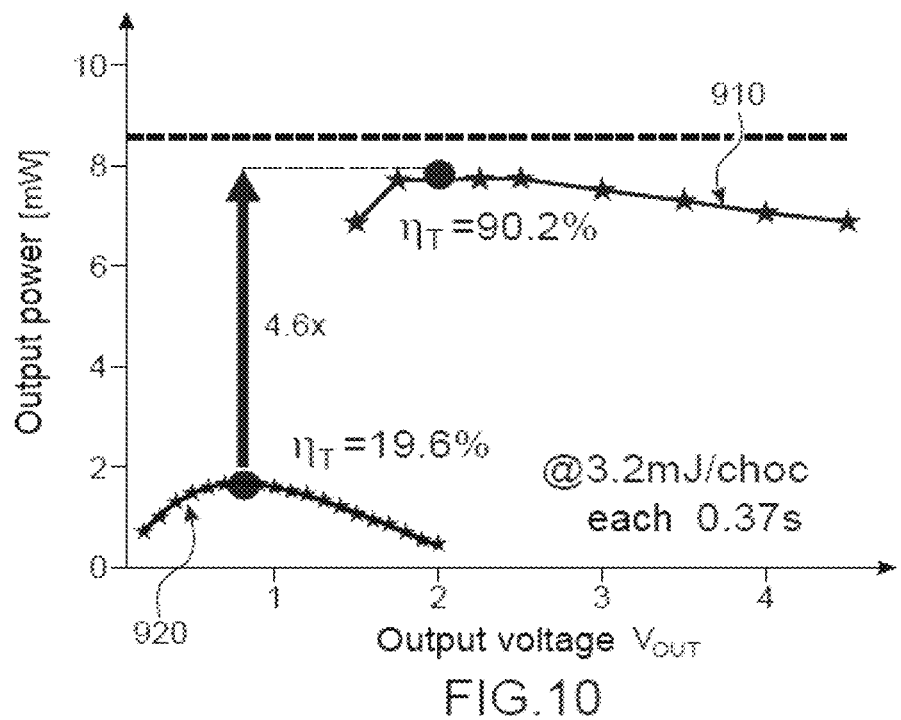
FIG. 10 is used to illustrate the performance in terms of power of an interface circuit as implemented according to the invention°.

FIG. 10 gives a curve 910 of the evolution of the output power as a function of the output voltage $V_{OUT}$ obtained with this same harvester (Ks=4.4, Rs=34 ohm, Ls=2 mH), but used in a shock mode.

Here an efficiency is obtained which is significantly higher than that (curve 920) obtained with a conventional interface circuit architecture with a diode bridge and which, unlike the other solutions of the prior art, does not use an external component of the inductor or capacitor type.

Alternative embodiments of an interface electronic circuit as described above can be provided within the scope of the invention. For example, in the embodiments presented above, the evaluation of the voltage Vh is carried out by averaging only over a time $T_{ON}$ or over a time $T_{OFF}$. It would be possible to carry out an evaluation of the voltage Vh by averaging over the entire period $T=T_{ON}+T_{OFF}$. For this purpose, a circuit comprising a part "DEN" modified compared to that of the circuits of FIGS. 3 and 7, could for example be considered. The evaluation of the voltage Vh could in this case be more precise but to the detriment of the compactness of the circuit.

Furthermore, as indicated above for the sake of simplicity, the terms AC and DC signals have been used to designate respectively the signal supplied by the energy harvester and the signal $V_{OUT}$ present at the output of the interface circuit. However, the input signal "AC" can in practice be a variable signal whose polarity (in practice that of the voltage source Vh) remains unchanged. An AC/DC rectifier may then be unnecessary and may not be present in the interface circuit. Likewise, the output signal $V_{OUT}$ is called continuous DC signal, insofar as in the examples illustrated it is produced at the terminals of a storage capacitor, which can also fulfil a "smoothing" function and also because in practice, provision can also be made for the charge circuit to be provided with a system for regulating the output voltage $V_{OUT}$ which allows to keep this voltage within a voltage range ensuring proper operation of the various electrical circuits connected to Cstore. However, an interface circuit can also operate even if the charge circuit has a fluctuating voltage $V_{OUT}$. The difference between the two input and output signals, called "AC" and "DC" signals therefore relates more to their polarity, the AC input signal being able to have a variable polarity (positive or negative Vin) while the DC signal is always of the same polarity, positive in our examples. It should be further noted that an interface circuit could also operate in a case where the voltage Vh would be constant.

Thus, an advantage of the various interface circuit examples described above is that they have a generic operation capable of adapting to different types of energy harvester, whether they have or not a variable polarity, whether they have or not a variable voltage amplitude, whether their operation is intermittent or not.

The invention claimed is:

1. An interface electronic circuit configured to be connected at the input to an energy harvesting stage, the energy harvesting stage having an equivalent circuit comprising an alternating voltage source in series with an inductor and a resistor, the interface electronic circuit being able to be connected at the output to a charging stage, the interface electronic circuit comprising:
   first and second input terminals receiving an electrical signal delivered by said energy harvesting stage between these terminals,
   a first switch, arranged between the first terminal and the second terminal and capable of alternately connecting or disconnecting the first terminal and the second terminal from each other, the closed or open state of the first switch being governed by a first control signal, a second switch, disposed between said first terminal and the charging stage and capable of alternately connecting or disconnecting an output of the interface electronic circuit of said charging stage by respectively allowing a current to flow or not between said first terminal and said charging stage, the open or closed state of the second switch being governed by a second control signal, and a control block for controlling the first switch and the second switch configured to produce said first control signal and said second control signal, the control block being able to pass the interface electronic circuit into an operating mode wherein said interface electronic circuit follows a succession of phases during each of which said interface electronic circuit adopts a first configuration and then a second configuration, the first configuration being a configuration among a discharging configuration and a charging configuration, the second configuration being a configuration among a charging configuration and a discharging configuration and different from the first configuration, the charging configuration being a configuration of the first switch and of the second switch so as to disconnect the output of the interface electronic circuit from said charging stage and that a charge current $I_{ON}$ flows between the first terminal and the second terminal, the discharging configuration being a configuration of the first switch and of the second switch, so that said first terminal and said second terminal are disconnected from each other and the output of said interface electronic circuit is connected to the charging stage so that a discharge current $I_{OFF}$ flows between the output of the interface electronic circuit and the charging stage, the interface electronic circuit being further provided with:

a regulation circuit for servo-controlling an average input impedance value of the interface electronic circuit to a predetermined optimum impedance value, said regulation circuit comprising:

a first circuit delivering a first signal proportional to an average current in the inductor of the energy harvesting stage, and a second circuit delivering a second signal proportional to an average voltage ($\overline{Vh}$) at the terminals of the internal voltage source of said energy harvesting stage, and a comparator configured to compare the first signal and the second signal and produce at the output according to this comparison an indicator signal capable of indicating that a ratio between the average voltage and the average current over a given time interval has reached the predetermined optimum impedance value and of triggering a passage from said second configuration to said first configuration.

2. The interface electronic circuit according to claim 1, wherein said regulation circuit comprises:

one or more charge current copy stages, one or more discharge current copy stages, a charge or discharge current differentiator stage, and a plurality of integrator stages, said regulation circuit being configured, from at least one copy of the charge current and at least one copy of the discharge current, to produce said first signal at the terminals of a first integration capacitor of a first integrator stage, and from at least one copy of the charge current and at least one derivative of a copy of the charge current or from at least one copy of the discharge current and at least one derivative of a copy of the discharge current, to produce said second signal at the terminals of a second integration capacitor of a second integrator stage.

3. The interface electronic circuit according to claim 1, the control block being configured so that:

when the interface electronic circuit is in said first configuration for a predefined duration at the end of the predefined duration:

the control block maintains the first configuration for at least a predetermined minimum period when the output of said comparator is in a predetermined state, said predefined duration being equal to the predetermined minimum period or to a multiple of said predetermined minimum period, the control block triggers a passage from the first configuration to said second configuration when the output of said comparator is in another state, different from said predetermined state, then when the interface electronic circuit passes into the second configuration, the control block maintains the second configuration until the output of said comparator switches from said other state to said predetermined state, this switching producing said indicator signal.

4. The interface electronic circuit according to claim 3, wherein the regulation circuit further comprises: a first reset element and a second reset element configured respectively to empty the first capacitor and the second capacitor following the reception of a reset signal, the reset signal being produced:

when said interface electronic circuit is in the first configuration and at least a predetermined minimum period has expired since the passage into the first configuration and the output of said comparator is in said predetermined state, or when said interface electronic circuit is in the second configuration and the output of said comparator switches to said predetermined state.

5. The interface electronic circuit according to claim 2, further comprising a delay stage configured to emit a signal of the end of a predetermined minimum period a predetermined delay after the start of the first configuration.

6. The interface electronic circuit according to claim 5, wherein the regulation circuit belongs to a generator block to which the signal of the end of the predetermined minimum period is transmitted, said generator block being configured, when the interface circuit passes into the first configuration, regardless of the state at the output of the comparator after the predetermined minimum period, to emit the reset signal then, after a new predetermined minimum period, when the output of said comparator is in said other state, to emit a signal indicating an end of the first configuration.

7. The interface electronic circuit according to claim 2, wherein the first capacitor is charged, during said given time interval, from a numerator current which depends on or is equal to a sum:

of a current resulting from a copy of the charge current for a duration of a charging configuration, and of another current resulting from a copy of the discharge current for a duration of a discharging configuration.

8. The interface electronic circuit according to claim 7, wherein the first signal depends on the product:

$$\overline{I_H}T = \int_0^T T_{ON}I_{ON} + T_{OFF}I_{OFF}dt$$

with:
- T the duration of said given time interval,
- $T_{ON}$ the duration of the charging configuration during the given time interval, and
- $T_{OFF}$ the duration of said discharging configuration during the given time interval.

9. The interface electronic circuit according to claim 2, wherein the first capacitor is charged from a numerator current, the numerator current depending on or being equal to a sum:
- of a current resulting from a copy of the charge current for a duration of a charging configuration,
- of a current resulting from a derivative of a copy of the charge current ($I_{ON}$), and
- of another current resulting from a copy of the discharge current for a duration of a discharging configuration.

10. The interface electronic circuit according to claim 9, wherein the first signal depends on the product:

$$\overline{I_H}T = \int_0^T T_{ON}\left(I_{ON} - \frac{1}{2}T_{ON}\frac{dI_{ON}}{dt}\right) + T_{OFF}I_{OFF}dt$$

with:
- T the duration of said given time interval,
- $T_{ON}$ the duration of the charging configuration during said given phase, and
- $T_{OFF}$ the duration of said discharging configuration during said given time interval.

11. The interface electronic circuit according to claim 7, wherein the regulation circuit comprises another integrator stage provided with another integration capacitor which is charged from a denominator current and at the terminals of which a voltage is produced, the denominator current depending on, or being equal to, the sum:
- of a current resulting from a copy of the charge current ($I_{ON}$) for the duration of a charging configuration, and
- of another current resulting from a derivative of a copy of the charge current for a duration of a charging configuration, said second signal produced at the terminals of said second integration capacitor being charged from a current resulting from a voltage-to-current conversion of said voltage produced by said other integration capacitor.

12. The interface electronic circuit according to claim 11, wherein said second signal is representative of the average voltage $\overline{Vh}$, with:

$$\overline{Vh} * T_{ON} = R_S \int_0^{T_{ON}} \frac{L}{R_S} * \frac{dI_{ON}}{dt} + I_{ON}dt$$

$T_{ON}$ being the duration of a discharging configuration.

13. The interface electronic circuit according to claim 7, wherein said first configuration is a discharging configuration, said indicator signal indicating an end-of-charging configuration, said regulation circuit further comprising:
- a voltage-to-current conversion stage configured to convert a copy of an output voltage at the output of said interface electronic circuit into an image current of this output voltage, said regulation circuit including another integrator stage provided with another integration capacitor which is charged from a denominator current and at the terminals of which an integration voltage is produced, the denominator current depending on, or being equal to, the sum:
- of a current, resulting from a conversion produced by said voltage-to-current conversion stage,
- of a current resulting from a copy of the discharge current, and
- of another current resulting from a derivative of a copy of the discharge current, said second signal being produced at the terminals of said second integration capacitor being charged from a current resulting from a voltage-to-current conversion of said integration voltage produced by said other integration capacitor.

14. The interface electronic circuit according to claim 13, wherein the second signal is representative of the average voltage $\overline{Vh}$, such that:

$$\overline{Vh} * T_{OFF} = R_S \int_0^{T_{OFF}} \frac{L}{R_S} * \frac{dI_{OFF}}{dt} + \frac{V_{OUT}}{R_S} + I_{OFF}dt$$

$T_{OFF}$ being the duration of a discharging configuration.

15. The regulation circuit according to claim 11, the regulation circuit further comprising: an element for resetting said other integration capacitor.

16. The interface electronic circuit according to claim 1, wherein the interface electronic circuit is provided with a rectifier, the rectifier being connected, on the one hand, to said first and second terminals of said interface electronic circuit, and on the other hand, connected to a terminal of said second switch.

* * * * *